Jan. 5, 1960  J. E. SMITH  2,919,628
PNEUMATIC GUN CONTROL
Filed April 25, 1956  3 Sheets-Sheet 1

INVENTOR.
JOHN E. SMITH
BY
*L. M. Smith, Jr.*
ATTORNEYS

United States Patent Office 2,919,628
Patented Jan. 5, 1960

2,919,628

PNEUMATIC GUN CONTROL

John E. Smith, Hatboro, Pa.

Application April 25, 1956, Serial No. 580,672

2 Claims. (Cl. 89—1)

(Granted under Title 35, U.S. Code (1952), sec. 266)

The invention herein disclosed may be used by or for the Government of the United States of America without the payment of any royalties thereon or therefor.

The present invention relates to a pneumatic gun control system and more particularly to a pneumatic control arrangement capable of distributing air from a single high pressure source to points of use at various reduced pressures as required.

A typical arrangement in use at present for distributing high pressure air or other fluid for use at different locations and pressure levels includes a common supply tank at the supply pressure and a separate line including a regulator-reducer valve for each particular point of use. The Mark 12, 20 mm. automatic gun mechanism now in use aboard certain combat aircraft requires, during its operation, high pressure air in four different places at two different pressures for each individual gun, and multiples of this when several such guns are in use. With present arrangements in use, each regulator-reducer and solenoid valve leading from the central air supply tank to the individual points of use on each gun requires a separate mounting. Because the mountings are located wherever space aboard the aircraft is found, the valves and individual lines are found at widely scattered points aboard the aircraft. As a result, excessive use of pipe lengths and couplings must be used which results in additional critical weight. Furthermore, severe difficulties arise in the maintenance of such gun systems when many guns are utilized, which of course, is not unusual aboard modern military aircraft. A further disadvantage of this arrangement is that the increased piping adds to the risk of leaks and failures.

The present invention provides a single source of high pressure air for use at a multiplicity of points at several different pressures. A single, compact unit has provision therein for most of the valves required. While the valves in themselves are conventional and may be commercially available, the compact unit in itself provides for a very efficient arrangement of valves which may be connected by ports rather than tubes and couplings, thereby eliminating unnecessary weight and possible sources of failure. In addition, this unit becomes a part of a system which is in itself compact and efficient and may be located at a single point for easy maintenance, service and inspection. It also minimizes the risk of leaks and failures.

An object of the present invention is the provision of an efficient and compact fluid pressure distributing system capable of delivering from a common high pressure source the fluid to a plurality of points at selected lower pressure levels.

Another object is to provide an air distribution system capable of delivering air to and maintaining air pressure at several different points of use at selected pressure levels from a common high pressure source.

A further object of the invention is the provision of a compact assembly unit forming a part of a larger system for delivering air from a common high pressure source to a plurality of points at selected lower pressure levels.

Still another object is to provide a compact unit having integral therein a plurality of pressure regulation valves properly interrelated by ports for distributing air from a common high pressure source to a plurality of points of use at different selected pressure values.

The exact nature of this invention as well as other objects and advantages thereof will be readily apparent from consideration of the following specification relating to the annexed drawings in which.

Figure 1:
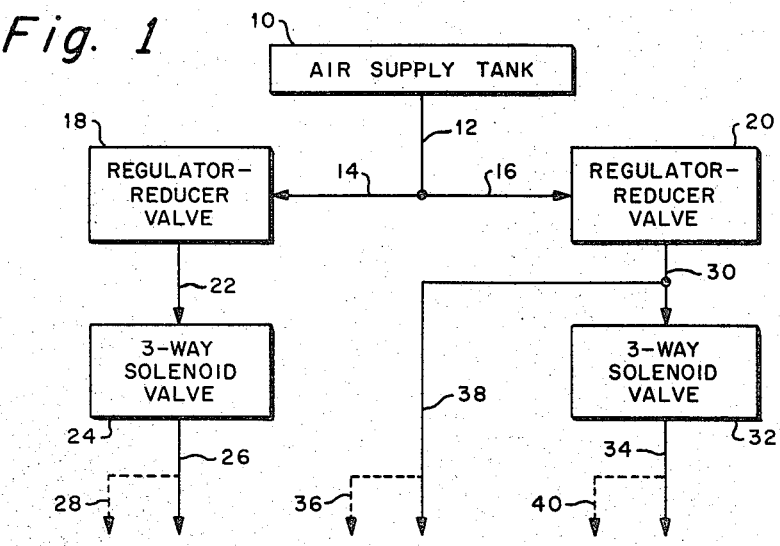
Fig. 1 is a typical system now in use for distributing high pressure air from a common source to the points of use in the Mark 12, 20 mm. automatic firing gun.

Fig. 1 shows a typical high pressure air supply system now used with the Mark 12, 20 mm. automatic firing gun used aboard aircraft. A central supply tank 10 containing air at 3000 p.s.i. delivers the air through lines 12, 14, and 16 to the regulator-reducer valves 18 and 20 in the manner shown. Valve 18 is of the conventional type which permits the pressure downstream of this valve to be regulated at 600 p.s.i. permitting the air from supply tank 10 to pass through when the pressure downstream of the valve falls below 600 p.s.i. and closing when the pressure comes up to this value. Valve 20 is similar to valve 18 and regulates the pressure downstream at 1000 p.s.i. The air passing through regulator-reducer valve 18 passes through line 22, a three-way solenoid valve 24, and line 26 to the feed mechanism of the gun described above. An additional line 28 will supply the feed mechanism of a second gun. Solenoid valve 24 is manually actuated by the pilot of the aircraft or by ordnance personnel for the purpose of loading the gun initially in preparation of firing.

The air at 1000 p.s.i. flowing through regulator-reducer valve 20 passes through line 30, three-way solenoid valve 32 and line 34 to the front of the gun charger. An additional line 40 will supply the front of charger of a second gun. Three-way solenoid valve 32 normally is closed, and manually operated by the pilot or operator of the gun for the purpose of reloading or clearing the gun in case of misfire, as is understood in the art. Line 38 coming directly from regulator-reducer valve 20 supplies the buffer and back of charger of the gun while an additional line 36 from line 38 will supply a second gun for this purpose. In the installation of such a system, each of the valves has its own feed and discharge lines. It is obvious that this system installed in an aircraft requires a multiplicity of individual lines and separate mountings of the valves and lines.

Figure 2:
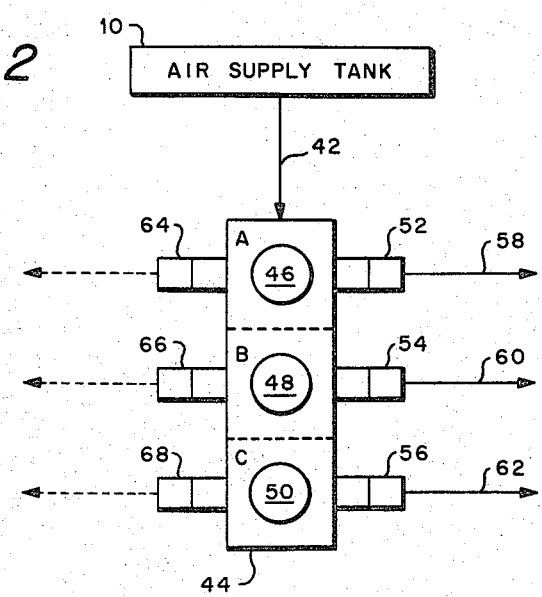
Fig. 2 shows the inventive system for carrying out this same distribution.

The arrangement shown in Fig. 1 may be replaced by the inventive system of Fig. 2. Supply tank 10 delivers air at 3000 p.s.i. through line 42 to the single intake of control unit 44. Unit 44 contains the necessary pressure regulator-reducer valves 46 and 48, and a three-way solenoid valve 50. These valves are connected by ports within the unit. Special disconnects 52, 54 and 56, which form the subject matter of a separate patent application Serial No. 580,673, filed April 25, 1956, now U.S. Patent No. 2,890,718, entitled "Quick Disconnect Unit for Pressurized System," in the name of John E. Smith, are connected to lines 58, 60 and 62, respectively. Line 58 supplies 600 p.s.i. air to the feed mechanism of the gun. Line 60 supplies 1000 p.s.i. air to the buffer in back of the charger of said gun. Line 62 supplies 1000 p.s.i. air to the front of the charger of the gun. If it is desired to supply a second gun, then on the opposite face of assembly unit 44 are the additional disconnects 64, 66 and 68 and their respective lines to the various portions of a second gun. Thus, each pneumatic control unit 44 may be utilized to supply two guns.

Figure 3:
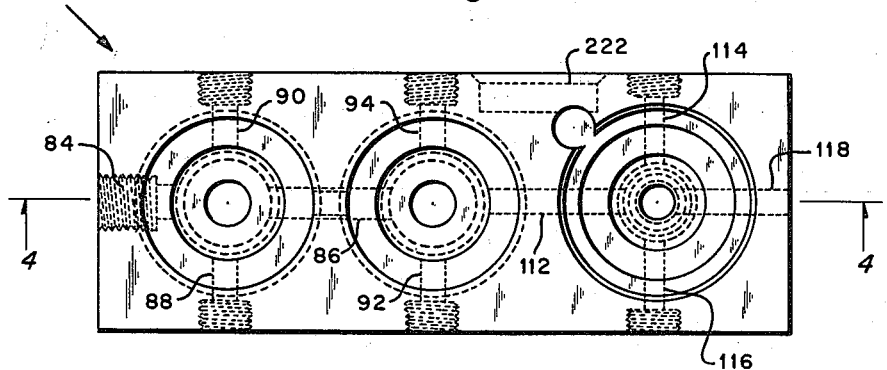
Fig. 3 is a plan view of the control unit.
Figure 4:
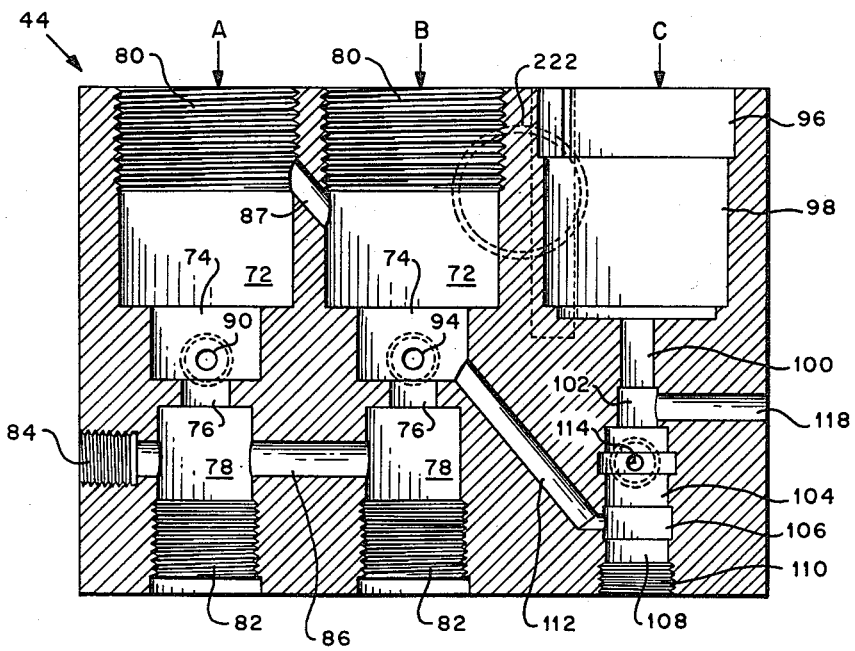
Fig. 4 is a section along 4—4 of the control unit in Fig. 3.

Figs. 3 and 4 show details of control unit 44 which may be constructed of a cast metal block such as aluminum or steel. Unit 44 may be considered to consist of three sections A, B, and C housing a valve in each section, as shown in Fig. 2. Unit 44 is drilled out to accommodate the valves described below. The hole in section A consists of the drilled sections 72, 74, 76 and 78. A pair of threaded sections 80 and 82 are also provided. The second hole in section B is identical to the first one in this particular embodiment because the valves going in each require identical fittings. The drilled out portion in section C of unit 44 is shaped differently from the previous sections in order to accommodate the three-way solenoid valve described below. The high pressure inlet 84 in section A is threaded to accommodate a male threaded member (not illustrated) in line 42. A bore 86 continues the supply of high pressure air to the hole in section B. A third access bore 87 to permit making bore 112 connects the threaded opening 80 of section A to portion 72 of the hole in section B. The outlets from the valves in sections A and B are through the cylindrical openings 88, 90, 92 and 94, best shown in Fig. 4. These openings are threaded to accommodate their appropriate disconnects, mentioned above.

The drilled out opening in section C of unit 44 for the three-way solenoid valve is constructed of the sections 96, 98, 100, 102, 104, 106, 108, and the threaded portion 110 to accommodate the bottom of the valve to be described below. Sections B and C of unit 44 are connected by a cylindrical passage 112 which connects section 74 of the former with bore section 106 of the latter for a purpose to be described below. The outlets for the solenoid valve are drilled through at 114 and 116 and are threaded for their disconnects. An exhaust port 118 for the discharge of air to the atmosphere is also provided.

Figure 5:
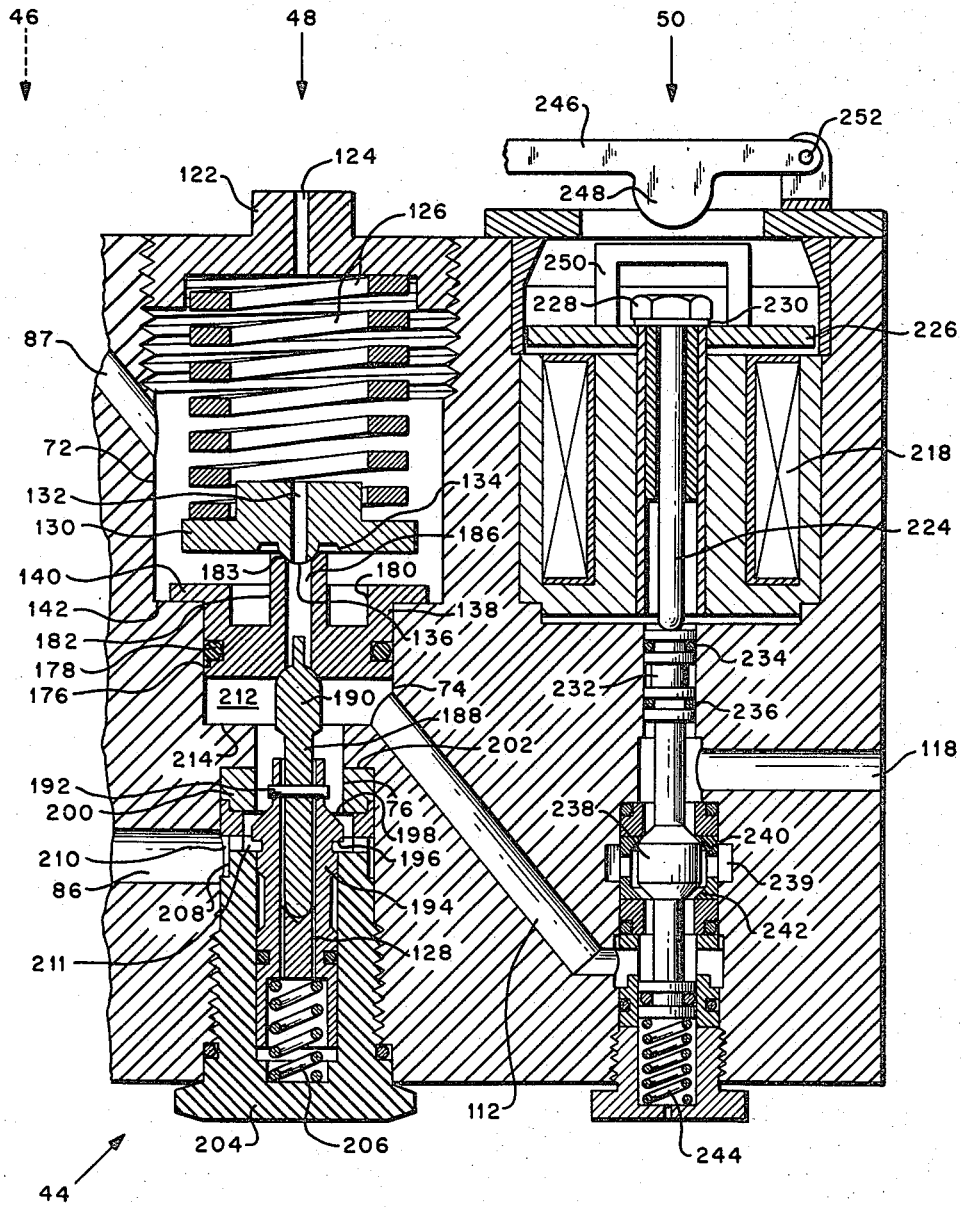
Fig. 5 shows a section of the unit with valves in the control unit.

Fig. 5 shows details of the pressure reducer-regulator and three-way solenoid valves used in control unit 44. The valves chosen for the particular arrangement described herein may be conventional.

Since both reducer valves 46 and 48 are identical except for having different operating pressures, it is necessary to describe only one in detail. Thus, reducer valve 48 of section B and solenoid valve 50 of section C are shown in Fig. 5. Valve 48 consists of a threaded cap 122 having an opening 124, and a spring 126 mounted on a flange member 130 which is provided with the proper shape to accommodate said spring and a drilled opening 132 therethrough. Flange 130 has an annular groove 134 and a rounded protruded portion 136 for the purpose described further below. Top piston assembly 138 has a flange 140 supported by shoulder 142 adjoining bore sections 72 and 74, an annular slot 176 for mounting the packing 178, an annular groove 180, and a centrally extended portion 182 having a dished end 183 for matching the protruding element 136 of flange 130. Top piston assembly 138 is also provided with an axial hole 186.

Lower piston assembly 188 having bleed holes 128 comprises a bulbous section 190 fitted into the reamed inlet of opening 186 in top piston assembly 138. Lower piston assembly 188 includes collar 192 for seating assembly 188 on control piston 194. Control piston 194 has a shoulder 196 which cooperates with corner 198 of annular ring 200 mounted against seat 202. A nut 204 provided with a spring 206 for acting on control piston assembly 194 and ultimately the lower piston assembly 188 is provided. Nut 204 has an upper shoulder 208 which defines one side of opening 210 through which the high pressure fluid enters the valve cavity.

Regulation chamber 212 is defined in the space under top piston assembly 138 and shoulder 214. In the case of the regulator valve in section A of unit 44, delivery of the air at the reduced pressure of 600 p.s.i. is through openings 88 and 90 as best shown in Figs. 3 and 4. Reducer valve 48 in section B delivers at 1000 p.s.i., the air through openings 92 and 94. Bore 86 connecting the two reducer valves delivers the air from valve 46 to valve 48 at the same pressure as the pressure of the fluid delivered through inlet 84, namely 3000 p.s.i., and is thereby merely a way of supplying both valves simultaneously. This is because of the annular space 211 around shoulder 196 of control piston assembly 194. However, it is noted that reducer valve 48 delivers air to solenoid valve 50 at 1000 p.s.i. because the delivery port 112 is connected to regulation chamber 212 of valve 120 and not annular space 211, as in the case of port 86 between the reducer valves.

The operation of the regulator valves is as follows:

Air from supply tank 10 enters assembly 44 through port 84 and is transferred through to port 86 and annular space 211. Hence, in reducer valve 46, top piston assembly 138 is exposed to this pressure on the bottom side and is exposed to the action of spring 126 on its upper side. The bottom face of upper piston assembly 138 is also exposed through bores 88 and 90 to the pressure at the point of use which is to be regulated at 600 p.s.i. by the action of this valve. Shoulder 196 of control piston 194 forms in effect an orifice with shoulder 198, thereby throttling the flow of fluid from port 86 into chamber 212. Spring 126 is selected so that if the pressure in ports 88 and 90 is at 600 p.s.i., the proper operating pressure, this will result in upper piston assembly 138 compressing spring 126 and permitting movement of control piston 194 to such a point that shoulder 196 comes in contact with shoulder 198 preventing the flow of fluid therethrough. The adjustment of threaded cap 124 selects the force on spring 126 for the desired pressure of use at the outlet of these valves. If the pressure in ports 88 and 90 reflecting the pressure at the points of use decreases thereby requiring flow of fluid from the air supply tank, spring 126 will overcome this decrease in pressure and force upper piston assembly 138 downwardly, thereby opening the space between shoulders 196 and 198 permitting the flow of fluid from the air supply tank 10 to bring up the pressure in ports 92 and 94 to operating values.

Three-way solenoid valve 50 is constructed of a coil and core assembly 218. A rod 224 on armature assembly 226 is mounted within core 218 through the use of a nut 228 and a lock washer 230. Rod 224 contacts stem 232 which has a pair of O rings 234 and 236. Stem 232 is provided with a bulbous portion 238 and has limited movement along its axis between the seats 240 and 242. Stem 232 is biased by a spring 244 against seat 240. An annular space 239 in unit 44 surrounding stem 232 at its bulbous section 238 is connected to ports 114 and 116 shown in Fig. 4. When solenoid valve 50 is in its unenergized position, as illustrated, high pressure air at 1000 p.s.i. flows from valve 48 through port 112, past seat 242, into annular space 239, and thence through ports 114 and 116 to the front of the charger of the gun. When valve 121 is energized, armature 226 is drawn into core 218 causing stem 232 to move bulbous section 238 from seat 240 into contact with seat 242. This closes off port 112, but vents annular space 239 and thereby the front of the gun charger to the atmosphere through exhaust port 118. The pilot or gun controller may have a switch to control the operation of this valve, while a lever 246 mounted on pin 252 may be provided for emergency operation of this valve.

As is understood in the art, solenoid valve 50 may be used as follows:

As long as the front of the charger of the gun is vented to atmosphere (solenoid valve 50 energized) the gun will function. Therefore, release of this energization switch by the gun controller will supply compressed air to the front of the gun charger and thereby stop the operation of the guns. As a further safety measure, it is understood that the electrical system (not shown) may be tied in with other equipment, such, as for example, the landing gear for deenergization automatically when the former is lowered for a landing.

Referring back to Fig. 2 it is understood that in the operation of this system a continuous and steady supply of high pressure fluid at the various pressure levels will automatically be delivered to the various points of use with all the proper control and regulation that is desired.

Of course, other arrangements may be employed for providing desired regulation in any desired system. The control unit may be designed to control or include any number of pressure-regulator or solenoid valves in various combinations for this purpose. Obviously, many modifications and variations of the present invention are possible in the light of the above teachings. It is, therefore, to be understood that within the scope of the appended claims the invention may be practiced otherwise than as is specifically described.

What is claimed is:

1. In a pneumatic control system for a gun having at least three points of use, a source of high pressure air, a unitary regulator unit receiving high pressure air from said source and having mounted internally therein a first pressure regulator-reducer valve for automatically maintaining a constant pressure source of air for the feed mechanism of said gun, a second pressure regulator-reducer valve for automatically maintaining a second constant pressure source of air for the buffer of said gun, and safety solenoid valve means for delivering upon deenergization of said solenoid valve high pressure air to the front of the charger of said gun for positively stopping the firing of said gun.

2. The pneumatic control system of claim 1 in which a plurality of internal ports in said unitary regulator unit distribute the flow of air from said source to said valves.

References Cited in the file of this patent

UNITED STATES PATENTS

| | | |
|---|---|---|
| 2,270,304 | Jacobson | Jan. 20, 1942 |
| 2,423,446 | Grant | July 8, 1947 |
| 2,455,948 | Ray | Dec. 14, 1948 |
| 2,643,674 | Lapsley et al. | June 30, 1953 |
| 2,686,535 | Tourneau | Aug. 17, 1954 |
| 2,731,975 | Boals | Jan. 24, 1956 |
| 2,786,482 | Bayer | Mar. 26, 1957 |